US011984247B2

(12) United States Patent
Baehr

(10) Patent No.: US 11,984,247 B2
(45) Date of Patent: May 14, 2024

(54) COVER UNIT FOR A CONVERTER HEAD OF A HIGH-VOLTAGE CONVERTER DEVICE, CONVERTER HEAD AND HIGH-VOLTAGE CONVERTER DEVICE

(71) Applicant: Siemens Energy Global GmbH & Co. KG, Munich (DE)

(72) Inventor: Sebastian Baehr, Eggolsheim (DE)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 235 days.

(21) Appl. No.: 17/642,823

(22) PCT Filed: Aug. 14, 2020

(86) PCT No.: PCT/EP2020/072840

§ 371 (c)(1),
(2) Date: Mar. 14, 2022

(87) PCT Pub. No.: WO2021/047857

PCT Pub. Date: Mar. 18, 2021

(65) Prior Publication Data

US 2022/0375674 A1 Nov. 24, 2022

(30) Foreign Application Priority Data

Sep. 13, 2019 (DE) ..................... 10 2019 214 006.8

(51) Int. Cl.
*H01B 17/26* (2006.01)
*H01F 27/04* (2006.01)
(Continued)

(52) U.S. Cl.
CPC ............. *H01F 27/04* (2013.01); *H01B 17/26* (2013.01); *H01F 27/06* (2013.01); *H01F 38/26* (2013.01); *H01F 27/002* (2013.01)

(58) Field of Classification Search
CPC ........ H01B 17/42; H01B 17/00; H01B 19/00; H01B 17/325; H01B 7/0045; H01B 17/14;
(Continued)

(56) References Cited

U.S. PATENT DOCUMENTS 2,142,188 A * 1/1939 Gaston .................... H01F 27/04 335/174
3,909,570 A * 9/1975 Harner .................... H01H 33/02 218/15
(Continued)

FOREIGN PATENT DOCUMENTS

CN 104658750 A 5/2015
CN 105203808 A 12/2015
(Continued)

OTHER PUBLICATIONS

Pfiffner "Inductive voltage transformers Outdoor operation SF 6 -gas insulated EGF (245-550) kv"; Jul. 1, 2017 (Jul. 1, 2017); XP055745554; Found on Internet: URL:https://www.pfiffner-group.com/fileadmin/user upload/PFIFFNER/Products/OIL AIS/EGF 245-550/Documents/EGF prospect EN~pdf [found on Oct. 30, 2020].
(Continued)

*Primary Examiner* — Krystal Robinson
(74) *Attorney, Agent, or Firm* — Laurence A. Greenberg; Werner H. Stemer; Ralph E. Locher

(57) ABSTRACT

A cover unit for a converter head of a high-voltage converter device includes a flat, preferably planar, cover element and an RIV shielding device peripherally surrounding the cover element for shielding radio interference voltage. The RIV shielding device is formed by a plurality of RIV shielding elements distributed peripherally on the edge of the cover element. The RIV shielding elements each have a substantially cylindrical shape, in particular a capsule shape. A
(Continued)

corresponding converter head and a corresponding high-voltage converter device are also provided.

13 Claims, 3 Drawing Sheets

(51) Int. Cl.

| | |
|---|---|
| ***H01F 27/06*** | (2006.01) |
| ***H01F 38/26*** | (2006.01) |
| *H01F 27/00* | (2006.01) |

(58) Field of Classification Search

CPC ........ H01B 17/32; H01B 17/26; H01B 17/28; H01B 19/04; H01B 3/46; H01B 17/005; H01B 17/36; H01B 17/56; H01B 3/006; H01B 3/30; H01B 3/441; H01B 7/2825; H01B 17/12; H01B 17/16; H01B 17/265; H01B 17/34; H01B 17/40; H01B 17/66; H01B 7/04; H01B 7/2813; H01B 9/02; H01B 13/012; H01B 17/301; H01B 17/38; H01B 17/54; H01B 17/58; H01B 3/28; H01B 3/40; H01B 3/427; H01B 7/228; H01B 7/292; H01B 7/328; H01B 9/04; H01B 9/0672; H01B 1/023; H01B 13/147; H01B 17/18; H01B 17/44; H01B 17/46; H01B 17/50; H01B 17/64; H01B 3/16; H01B 3/306; H01B 7/0009; H01B 7/009; H01B 7/0233; H01B 7/0275; H01B 7/043; H01B 7/182; H01B 7/184; H01B 7/28; H01B 7/30; H01B 9/003; H01B 9/006; H01B 1/00; H01B 1/18; H01B 11/1808; H01B 11/1834; H01B 11/1869; H01B 11/1895; H01B 12/00; H01B 12/16; H01B 13/0013; H01B 13/0036; H01B 13/01263; H01B 13/016; H01B 13/08; H01B 13/0891; H01B 13/10; H01B 13/145; H01B 13/146; H01B 13/22; H01B 13/26; H01B 17/02; H01B 17/22; H01B 17/30; H01B 17/303; H01B 17/306; H01B 17/308; H01B 17/52; H01B 17/60; H01B 3/00; H01B 3/025; H01B 3/04; H01B 3/084; H01B 3/10; H01B 3/105; H01B 3/12; H01B 3/302; H01B 3/305; H01B 3/307; H01B 3/32

See application file for complete search history.

(56) References Cited

U.S. PATENT DOCUMENTS

| | | | | |
|---|---|---|---|---|
| 4,355,200 | A * | 10/1982 | Wheeler ................ | H01B 17/32<br>174/140 S |
| 6,218,627 | B1 | 4/2001 | Shindo et al. | |
| 2014/0262485 | A1* | 9/2014 | Miller ...................... | H02G 7/00<br>174/5 R |
| 2021/0082602 | A1* | 3/2021 | Pusthay ................. | H01B 17/42 |

FOREIGN PATENT DOCUMENTS

| | | | | | |
|---|---|---|---|---|---|
| CN | 205211581 | U | | 5/2016 | |
| CN | 105680430 | A | | 6/2016 | |
| CN | 105742044 | A | * | 7/2016 | ......... H01F 27/2885 |
| CN | 105742044 | A | | 7/2016 | |
| DE | 3908107 | A1 | | 9/1990 | |
| DE | 69209325 | T2 | | 8/1996 | |
| EP | 0038284 | A1 | | 10/1981 | |
| WO | WO 2018113954 | A1 | | 6/2018 | |

OTHER PUBLICATIONS

ABB S.P.A.: “High voltage products: TVI—SF6 Inductive Voltage Transformer”, IT, Lodi, 2011 (2GJA708461—Rev.—, en—Brochure TVI—Jan. 2011 (mt))—Company trypface, pp. 1-4; 2011.

Pfiffner: “Inductive voltage transformers Outdoor operation SF 6—gas insulated EGF (245-550) kv”; Jul. 1, 2017 (Jul. 1, 2017); XP055745554; Found on Internet: URL:https://www.pfiffner-group.com/fileadmin/user upload/PFIFFNER/Products/OIL AIS/EGF 245-500/Documents/EGF prospect EN~pdf [fround on Oct. 30, 2020].

* cited by examiner

COVER UNIT FOR A CONVERTER HEAD OF A HIGH-VOLTAGE CONVERTER DEVICE, CONVERTER HEAD AND HIGH-VOLTAGE CONVERTER DEVICE

FIELD AND BACKGROUND OF THE INVENTION

The invention relates to a cover unit for a converter head of a high-voltage converter device, comprising a flat, preferably planar, cover element and an RIV shielding device that peripherally surrounds the cover element for shielding radio interference voltage.

The invention further relates to a corresponding converter head with a cover unit and a corresponding high-voltage converter device with a base, a converter head and a support insulator between the base and the converter head.

The datasheet of the inductive open-air voltage converter, type EGF, manufactured by PFIFFNER (datasheet 2017 April) describes this voltage converter as an $SF_6$-gas insulated, high-voltage converter device with a base, a converter head and a support insulator between the base and the converter head. The active part of the voltage converter is located in a pressure-resistant housing of the base. The converter head comprises a cover unit with a plate-shaped cover element, an RIV shielding device that circumferentially surrounds the cover element for shielding radio interference voltage, and connection lugs arranged at the edge of the cover element as a "primary connection". A terminal box, and attachment structures designed as what are known as lifting eyes, are furthermore arranged at the base. Converter devices of this sort are employed in high-voltage switchgears of 245-550 kV. They convert high voltages into standardized equivalent values for counters, measurement and protection devices. The RIV shielding device here is designed as what is known as a head toroid.

Shielding toroids of this sort, which are manufactured by rolling closed toroidal aluminum tube rings, and which are fastened as single or double toroids to the converter head by means of welded fastening elements, are very expensive and complex to manufacture.

These toroids, furthermore, as a result of their size and shape, cannot be mounted before the converter device is erected, and run as an additional auxiliary part in addition to the transport of the converter device itself. Additional costs, both logistical and associated with assembly, arise for the manufacturer as a result of this separation, since an additional shipment, with packing, has to be organized, along with additional fitters on the building site to assemble these toroids.

SUMMARY OF THE INVENTION

The invention is based on the object of providing measures through which the assembly of the corresponding high-voltage converter device can be simplified.

The object is achieved according to the invention by the features of the independent claims.

Advantageous embodiments of the invention are the objects of the dependent claims.

In the cover unit according to the invention for a converter head of a high-voltage converter device, which comprises a flat, preferably planar, cover element and an RIV shielding device for shielding radio interference voltage that circumferentially surrounds the cover element, it is provided that the RIV shielding device is formed by a plurality of RIV shielding elements distributed peripherally on the edge of the cover element, wherein said elements each have a substantially cylindrical shape, in particular a capsule shape. The structure of these RIV shielding elements is relatively simple, and they are therefore, on the one hand, easy and economical to manufacture and, on the other hand, can be handled easily. If the RIV shielding elements are arranged in an annular structure which surrounds the edge of the cover element in a manner which, while it does have gaps, is nevertheless relatively complete, an RIV shielding can be achieved that is comparable to the shielding that can be achieved by means of a shielding toroid, i.e. the head toroid explained at the beginning.

According to one preferred embodiment of the invention, the RIV shielding elements are each mounted on the cover element in such a way that they can be repositioned, in particular can be rotated. In this way it is ensured that large parts of the cover element are easily accessible from the outside, even when the shielding elements are preassembled.

According to a further preferred embodiment of the invention, at least one attachment structure is provided, arranged at the edge of the cover element, designed in particular as an opening or eye structure. In this context, the term "attachment structure" is to be understood analogously to the terms "attachment means" and "attachment point". Attachment means and attachment points are the connection between a load and a means of carrying, such as a crane hook.

Attachment lugs are often provided on this type of cover unit for high-voltage converter devices. In a preferred embodiment of the cover unit according to the invention, at least one attachment lug is provided, arranged at the edge of the cover element.

It is preferably provided here that the cover unit comprises at least one further RIV shielding element for shielding radio interference voltage arranged at the edge of the attachment lug or at least one of the attachment lugs. This shielding then relates to the respective connecting lug, but can, however, also be thought of as part of the RIV shielding device.

According to yet another preferred embodiment of the invention, the RIV shielding elements can be repositioned/rotated in such a way that they (i) shield the cover element in a first arrangement and (ii) in a second arrangement, expose the at least one attachment structure and/or the at least one attachment lug for ease of handling, in particular over a large area. Although there is no shielding effect, or not a full one, in this position, the handling of the attachment structure or the attachment lug is itself not performed when the high-voltage converter device is in operation.

The cover element is preferably plate-shaped, i.e. designed as a plate. This is common, proven practice.

It is advantageously provided that the cover element has a rectangular, in particular square, base area, wherein the RIV shielding elements are attached to the sides of this base area, and the RIV shielding elements, when in use as the RIV shielding device, extend with their longitudinal axis along the sides of this base area. In a very simple case, the cover element here is designed as a plate with a rectangular, in particular square, base area.

In the converter head according to the invention for a high-voltage converter device that comprises a cover unit with a flat, preferably planar, cover element and an RIV shielding device circumferentially surrounding the cover element for shielding radio interference voltage, it is provided that the cover unit is designed as the cover unit referred to above.

In the high-voltage converter device according to the invention, with a base, a converter head and a support insulator between the base and the converter head, it is provided that the converter head is designed as the converter head referred to above.

In a preferred embodiment of the high-voltage converter device according to the invention, it is provided that the base comprises further attachment structures. This too is common, proven practice.

The base in particular comprises a base plate and a housing mounted thereon, in which an active part of the high-voltage converter device, a type of transformer, is located. A terminal box can, furthermore, be arranged laterally at the housing of the base.

Said further attachment structures are preferably located on the base plate of the base. These are, in particular, designed as fixing eyes, i.e. also as a type of eye or opening structure.

Altogether, the following advantages emerge:

(a) reduction of logistic effort and costs for suppliers;
(b) reduction in the assembly effort by suppliers at customers, or it may be installed by the customers themselves through the provision of assembly instructions;
(c) reduction in component costs, since the geometry is easily manufactured; and
(d) no additional load swivels or lifting lugs are needed.

This results in a minimization of costs for components and assembly.

The properties, features and advantages of this invention, described above, as well as the manner in which this is achieved, will be understood with greater clarity and meaning in connection with the following description of exemplary embodiments, which are explained in more detail in association with the drawings.

DETAILED DESCRIPTION OF THE INVENTION

Figure 1:
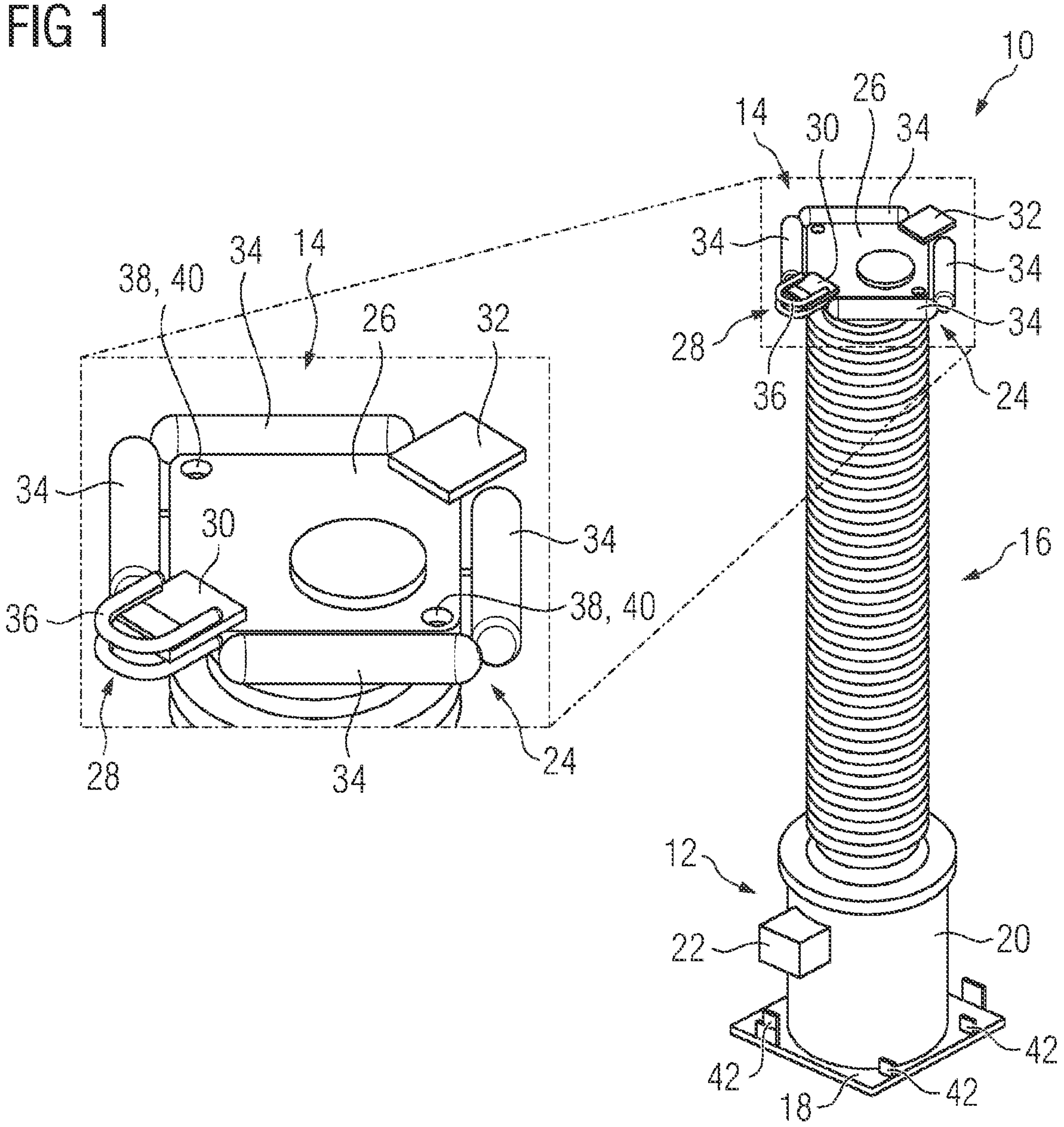
FIG. 1 shows, on the right-hand side, a high-voltage converter device and, on the left-hand side, a converter head of this high-voltage converter device with a cover unit according to one embodiment of the invention.

On the right-hand side, FIG. 1 shows a high-voltage converter device 10 designed as an inductive voltage converter (inductive voltage transformer). The high-voltage converter device 10 can be roughly divided into the components of the base 12, converter head 14 and the intermediate part with the support insulator 16 arranged between the base 12 and the converter head 14. The support insulator surrounds a potential dissipation element (not shown) extending between the base 12 and the converter head 14. The base 12 comprises a base plate 18 and a housing 20 mounted thereon, in which the active part (not shown) of the high-voltage converter device 10, a type of transformer, is located. The insulation is achieved by means of $SF_6$ gas or another insulating gas. A terminal box 22, furthermore, is arranged laterally at the housing 20 of the base 12. The converter head 14 comprises a cover unit 24 with a cover element 26, an RIV shielding device surrounding the cover element 26 circumferentially (RIV: radio interference voltage) for shielding radio interference voltage and attachment lugs 30, 32 arranged at the edge of the cover element 24 located on opposite sides to each other as “primary terminals of the transformer”.

The converter head 14, with the cover unit 24, is shown in detail on the left-hand side of FIG. 1. The cover element 26 is designed in the form of a plate, and has a square base area. The two connecting lugs 30, 32 here are arranged at mutually opposite corners of the square base area, and point towards the outside beyond the base area with their free ends. The RIV shielding device 28 is formed by a plurality (four, in the present case) of RIV shielding elements 34 distributed circumferentially around the edge of the cover element 24. When the high-voltage converter device 10 is in the operating state, as is shown here in FIG. 1, the RIV shielding elements 34 are arranged such that they form an annular structure surrounding the edge of the cover element 26. For this purpose, one of the RIV shielding elements 34 is fastened, or, more accurately, attached rotatably, at each of the sides of the square base area. The RIV shielding elements 34 each have an essentially cylindrical shape, which will be considered in detail again in association with FIG. 2. At the outer edge of one of the attachment lugs 30, a further RIV shielding element 36 is arranged for shielding radio interference voltage, having an essentially U-shaped form and extending outside, along the extent of the corresponding attachment lug 26.

In the two corners of the cover element 26 that are not “occupied” by attachment lugs 26, openings 38 extend through the plate-shaped cover element 26. These openings 38 serve as attachment structures 40 for the transport and manipulation of the high-voltage converter device 10 during assembly. In this context, the terms eyes or opening structures may also be used. Further attachment structures 42 are located at the base plate 18 of the base 12. These are designed as fixing eyes, i.e. also as a type of eye or opening structure.

The base plate 18 also has a square base area, and the plate-shaped cover element 26 and the base plate 18 are aligned parallel to one another, although mutually rotated through 45°.

Converter devices 10 of this sort are employed in high-voltage switchgears of more than a hundred kilovolts. They convert high voltages into standardized equivalent values for counters, measurement and protection devices. The RIV shielding device 28 with the individual RIV shielding elements 34 now replaces the otherwise usual shielding device in the form of what is known as a head toroid.

Figure 2:
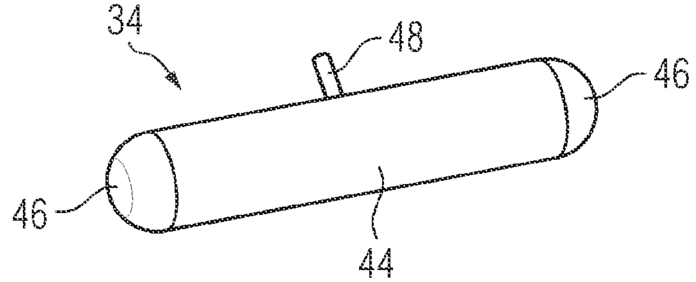
FIG. 2 shows an RIV shielding element of the cover unit in detail.

FIG. 2 shows one of the RIV shielding elements 34 of the cover unit 24 in detail. The RIV shielding element 34 has the form of a capsule that is composed of a cylindrical or tubular middle piece 44 aligned along a longitudinal axis of the shielding element, and hemispherical end caps 46 adjacent to the two ends of this middle piece 44. The RIV shielding element 34, furthermore, comprises an axial element 48 leading centrally out of the middle piece 44, through which the RIV shielding element 34 is mounted rotatably at the cover element 24. The axial element 48 is aligned here perpendicularly to the longitudinal axis of the RIV shielding element 34.

Figure 3:
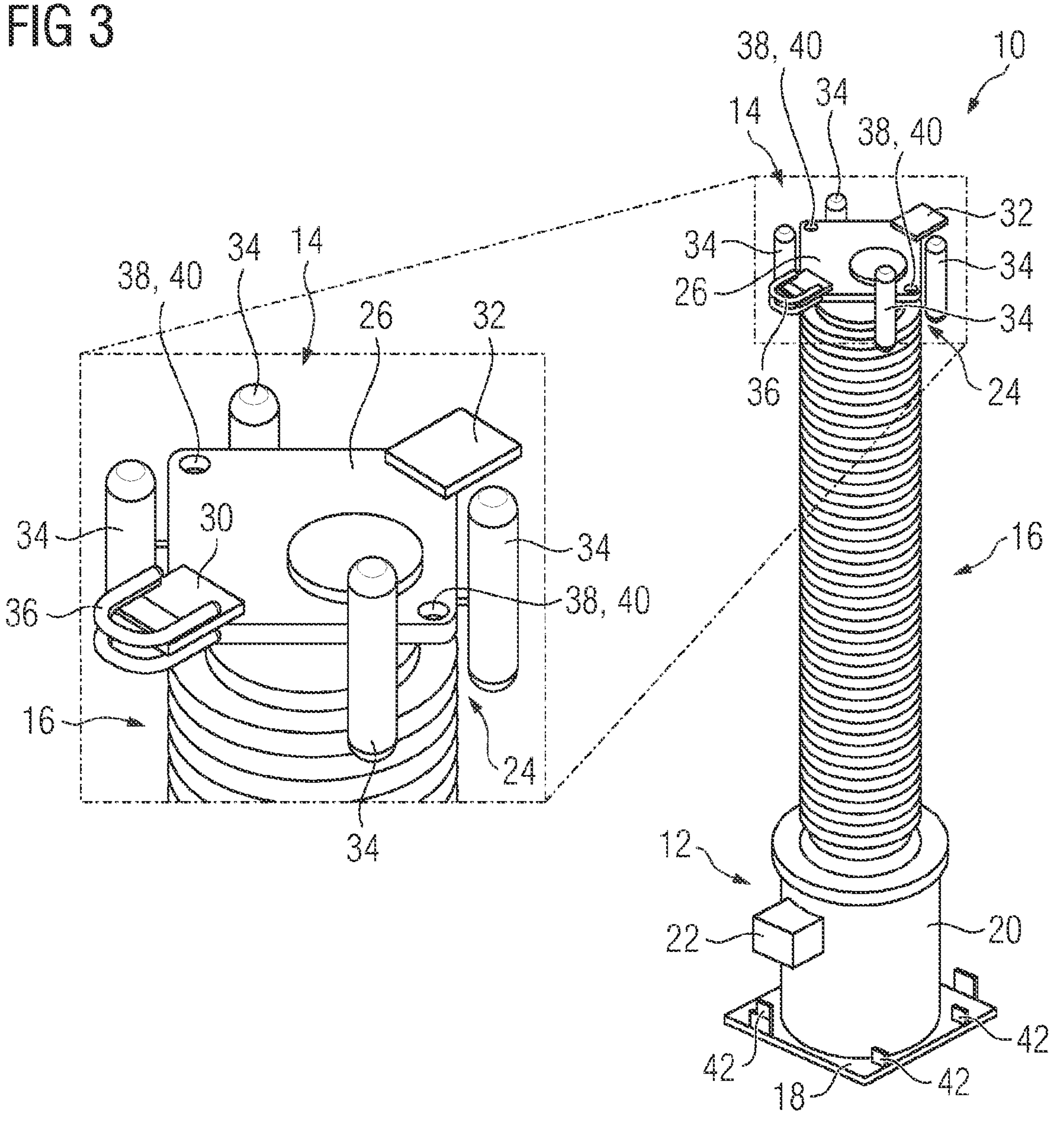
FIG. 3 shows, on the right hand side, the high-voltage converter device already illustrated in FIG. 1 and, on the left-hand side, the converter head with the cover unit, wherein the RIV shielding elements are rotated.

FIG. 3 shows, on the right hand side, the complete high-voltage converter device 10 already illustrated in FIG. 1, and, on the left-hand side, the converter head 14 with the cover unit 24, wherein the individual RIV shielding elements 34 are rotated through 90° with respect to their alignment in FIG. 1. In this alignment, they are all aligned parallel to the longitudinal axis of the converter device 10.

Whereas, in the first arrangement shown in FIG. 1, the RIV shielding elements 34 shield the cover element 26, the RIV shielding elements 34, rotated through 90° in the second arrangement shown in FIG. 3, expose the attachment structures 40 for ease of handling.

New or improved possibilities for transport and assembly of the high-voltage converter device 10 emerge in this way.

Figure 4:
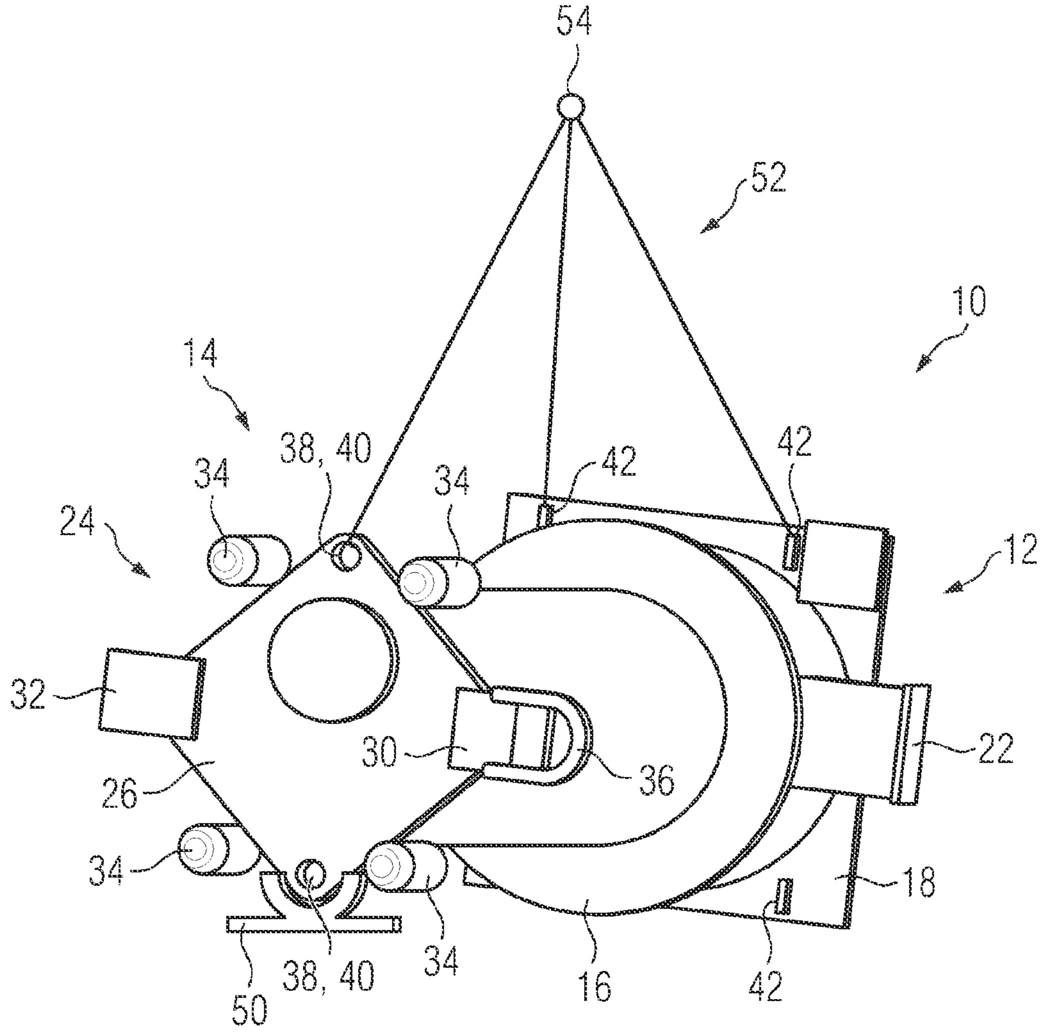
FIG. 4 shows the high-voltage converter device in a transport situation.

FIG. 4 shows the high-voltage converter device 10 in a transport position. Because the plate-shaped cover element 26 and the base plate 18 are aligned such that they are rotated through 45° with respect to one another, the high-voltage converter device 10 is located on one side of the base plate 18, and a corner of the plate-shaped cover element 26 is on a floor of a transport device (such as a transport box or a loading surface). One of the attachment structures 38 is located at the corner of the plate-shaped cover element 26.

The high-voltage converter device 10 can now be fastened, or is fastened, in/at the transport device by this attachment structure 38 and a transport fastening 50 fixed to the floor of the transport device.

To assemble the high-voltage converter device 28, it must first be lifted off the floor of the transport device. This can, for example, be done by means of a suspension 52 formed by a carrying harness. In addition to the other of the two attachment structures 38 of the plate-shaped cover element 26, this also uses one or a plurality of the further attachment structures 42 at the base 12.

The carrying harness comprises, for example, flexible carrying elements in the form of ropes, chains, belts etc. that fasten the attachment structures 38, 42 of the high-voltage converter device 10 to a central suspension point 54.

In this way, the high-voltage converter device 10 can, for example, be held and/or moved by a crane hook.

Altogether, the following advantages result:

(a) reduction in logistic effort and costs when transporting the high-voltage converter device 10;

(b) reduction in the assembly effort; the assembly effort can be reduced to the extent that the high-voltage converter device 10 can also be installed by the customer themselves by means of provided assembly instructions;

(c) reduction in component costs, since the geometry is easily manufactured;

(d) no additional load swivels or lifting lugs are needed. This results in a minimization of costs for components and assembly; and (e) the RIV shielding device 28 can be already preinstalled during transport and assembly.

LIST OF REFERENCE SIGNS

10 High-voltage converter unit
12 Base
14 Converter head
16 Support insulator
18 Base plate
20 Housing
22 Terminal box
24 Cover unit
26 Cover element
28 Shielding device
30 Attachment lug
32 Attachment lug
34 RIV shielding element
36 Further RIV shielding element
38 Opening
40 Attachment structure
42 Further attachment structure
44 Middle piece
46 End cap
48 Axial element
50 Transport fastening
52 Suspension
54 Suspension point

The invention claimed is:

1. A cover unit for a converter head of a high-voltage converter device, the cover unit comprising:

a flat cover element having an edge; and an RIV shielding device peripherally surrounding said cover element for shielding radio interference voltage;

said RIV shielding device being formed of a plurality of RIV shielding elements each having a cylindrical shape, said plurality of RIV shielding elements being distributed peripherally on said edge of said cover element.

2. The cover unit according to claim 1, wherein said cover element is planar, and said plurality of RIV shielding elements each having a capsule shape.

3. The cover unit according to claim 1, wherein said plurality of RIV shielding elements are each mounted on said cover element and configured to be repositioned or rotated.

4. The cover unit according to claim 1, which further comprises at least one attachment structure disposed at said edge of said cover element.

5. The cover unit according to claim 4, wherein said at least one attachment structure is an opening or an eye structure.

6. The cover unit according to claim 4, which further comprises at least one attachment lug disposed at said edge of said cover element.

7. The cover unit according to claim 6, which further comprises at least one further RIV shielding element for shielding radio interference voltage, said at least one further RIV shielding element disposed at an edge of an attachment lug or at an edge of at least one of a plurality of attachment lugs.

8. The cover unit according to claim 6, wherein said plurality of RIV shielding elements are configured to be repositioned to:

shield said cover element in a first configuration, and expose at least one of said at least one attachment structure or said at least one attachment lug for ease of handling in a second configuration.

9. The cover unit according to claim 1, wherein:

said cover element has a rectangular base area;

said plurality of RIV shielding elements are attached to sides of said base area; and said plurality of RIV shielding elements, when in use as said RIV shielding device, extend along said sides of said base area.

10. The cover unit according to claim 9, wherein said base area is square.

11. A converter head for a high-voltage converter device, the converter head comprising:

a cover unit according to claim 1.

12. A high-voltage converter device, comprising:

a base;

a converter head according to claim 11; and a support insulator disposed between said base and said converter head.

13. The high-voltage converter device according to claim 12, wherein said base includes attachment structures.

* * * * *